D. G. MANGES.
LOGGING DEVICE.
APPLICATION FILED SEPT. 27, 1917. RENEWED OCT. 19, 1921.
1,411,053.
Patented Mar. 28, 1922.
3 SHEETS—SHEET 2.
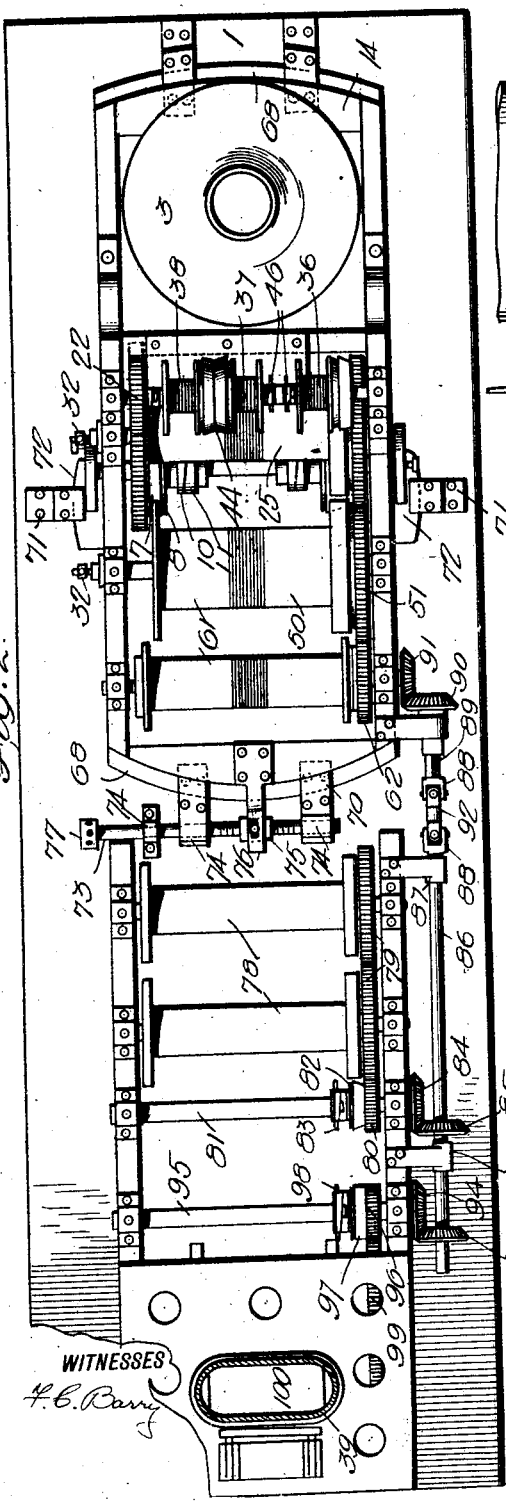
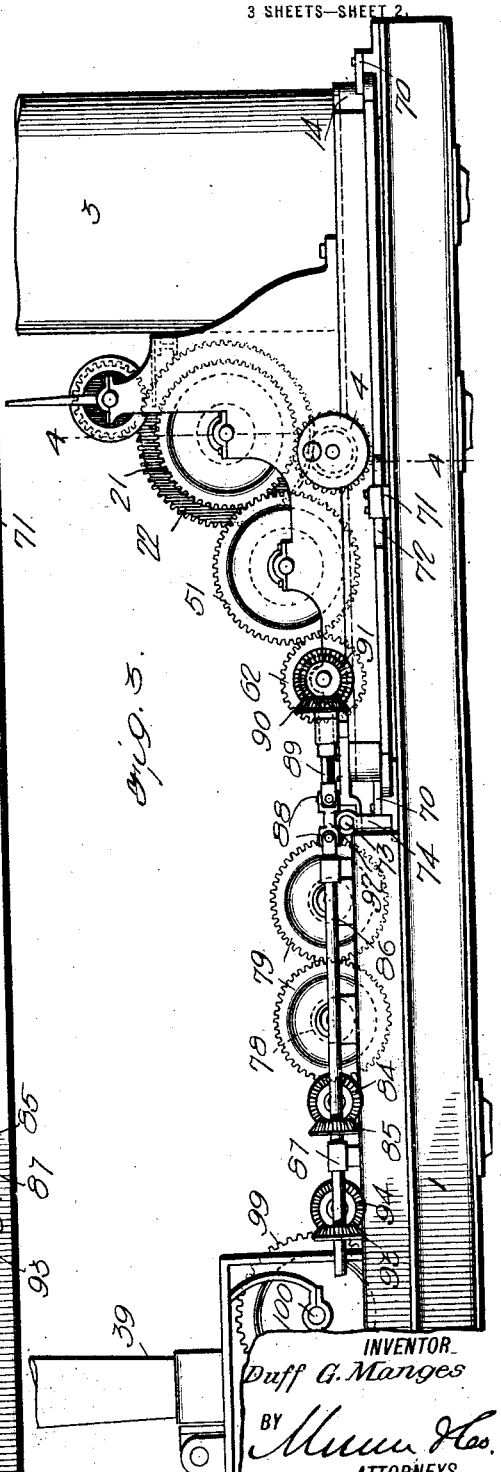
WITNESSES
INVENTOR
Duff G. Manges
BY
ATTORNEYS D. G. MANGES.
LOGGING DEVICE.
APPLICATION FILED SEPT. 27, 1917. RENEWED OCT. 19, 1921.
1,411,053.
Patented Mar. 28, 1922.
3 SHEETS—SHEET 3.
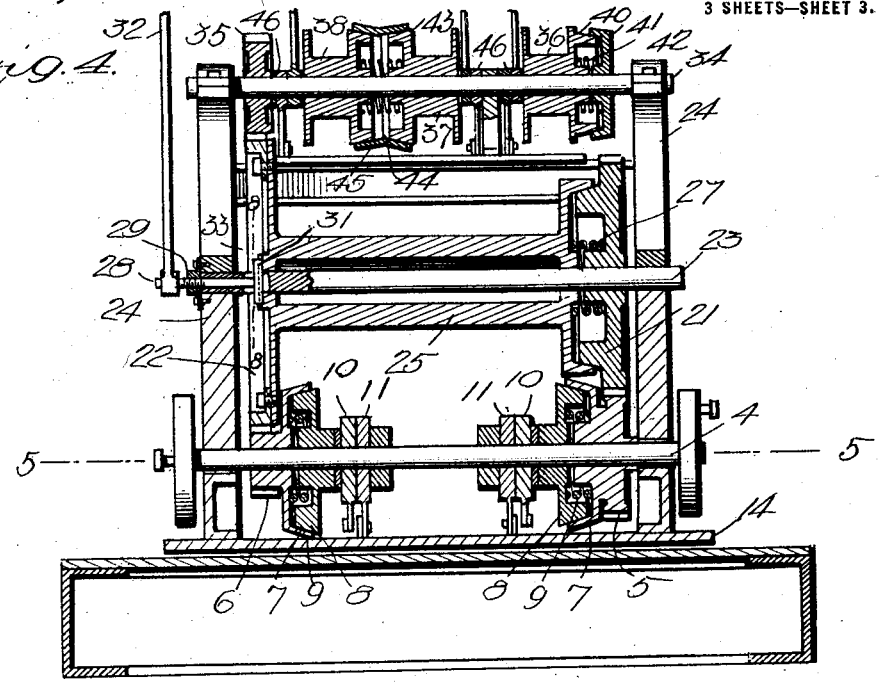
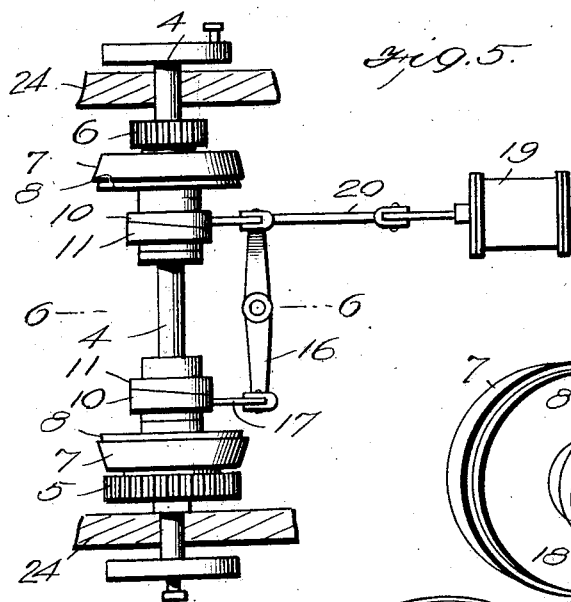
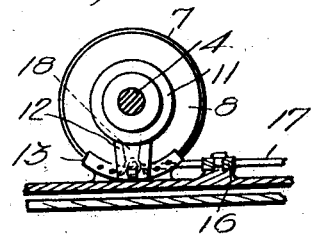
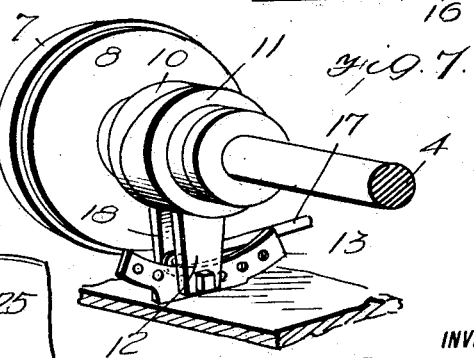
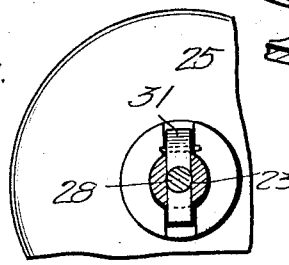
WITNESSES
Y. E. Barry
INVENTOR
Duff G. Manges
BY
Munn & Co.
ATTORNEYS

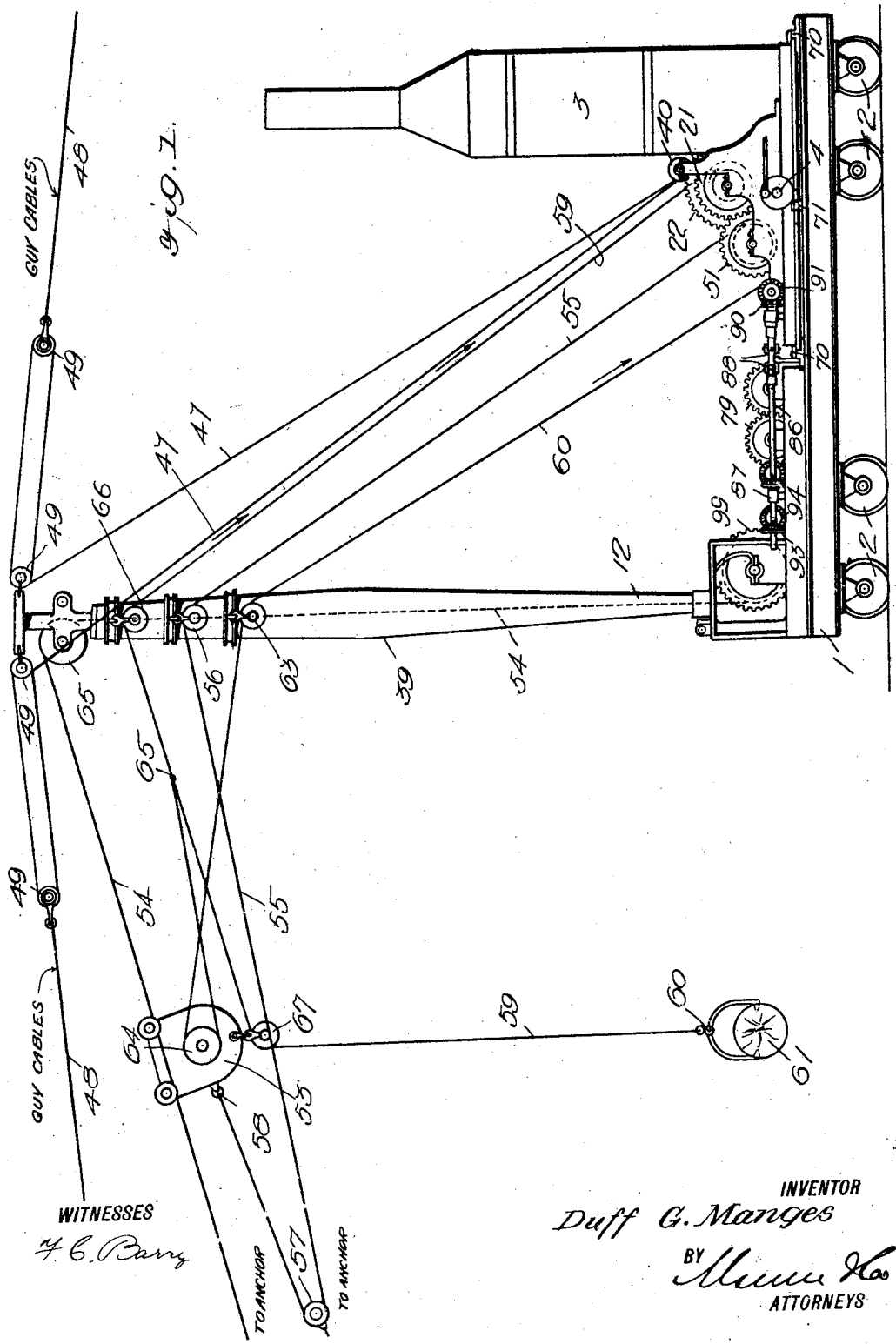

UNITED STATES PATENT OFFICE.

DUFF GERARD MANGES, OF TELLICO PLAINS, TENNESSEE, ASSIGNOR TO LIDGERWOOD MANUFACTURING COMPANY, OF NEW YORK, N. Y., A CORPORATION OF NEW YORK.

LOGGING DEVICE.

1,411,053.  Specification of Letters Patent.  Patented Mar. 28, 1922.

Application filed September 27, 1917, Serial No. 193,551. Renewed October 19, 1921. Serial No. 508,830.

*To all whom it may concern:*

Be it known that I, DUFF G. MANGES, a citizen of the United States, and a resident of Tellico Plains, in the county of Monroe and State of Tennessee, have invented new and useful Improvements in Logging Devices, of which the following is a specification.

My invention is an improvement in logging devices, and has for its object to provide mechanism in connection with a power operated logging device for permitting a series of drums to be operated from a single engine.

A further object of the invention is to provide a series of drums in connection with the engine for guying purposes, placed above and behind the other drums, so that the lines will not interfere with the lines from the main drums.

A further object of the invention is to provide an adjustable bed frame for the engine to permit the drums to be readily alined with the sheaves and spar.

A further object is to provide an engine having a combination of connecting pinions frictionally controlled for permitting the speed to be changed, to eliminate friction, and wherein the pinions are operated in alternation to interlock the same to prevent operation of one while the other is in operation.

In the drawings:

Figure 1 is a diagrammatic side view of the device;

Figure 2 is a top plan view, with the spar in section;

Figure 3 is an enlarged side view of the driving mechanism;

Figure 4 is a section on the line 4—4 of Figure 3;

Figure 5 is a section on the line 5—5 of Figure 4;

Figure 6 is a section on the line 6—6 of Figure 5;

Figure 7 is a perspective view of the operating mechanism for the clutch; and

Figure 8 is a section on the line 8—8 of Figure 4.

In the present embodiment of the invention, a car or truck 1 is provided having supporting wheels 2, and upon the car is mounted a motor 3, a steam engine in the present instance, said engine being of the usual construction. The engine shaft 4 is provided with pinions 5 and 6 near its ends, the pinion 5 being of greater diameter than the pinion 6, and the said pinions are loose on the shaft. Each pinion has connected therewith one of the elements 7 of a friction clutch, the other element 8 being feathered on the shaft, and being normally spring pressed away from the element 7 by a spring 9. These clutches are similar, and they are operated by means of sectional collars, each collar consisting of sections 10 and 11. The adjacent faces of the sections are beveled in opposite directions, so that when the sections are moved angularly with respect to each other from the position of Figure 5, the sections 8 of the clutches will be moved into contact with the sections 7 to connect the pinion 5 or 6, as the case may be, to the shaft 4. One of the sections, the section 11 in the present instance, has a radial arm 12, which is adapted to be connected to one of the openings in a sector 13 arranged on the bed plate 14 for the engine. This section 13 has a series of openings, and the arm 12 has an opening adapted to register with one of the openings of the sector and to be connected to the said opening by a bolt and nut 15. Thus the section 11 may be adjusted with respect to the shaft.

A lever 16 is pivoted intermediate its ends in front of the shaft 4, and this lever is connected by links 17 with radial arms 18 on the sections 10 of the collars. It will be evident that by swinging the link either pinion 5 or 6 may be connected to the shaft, and since the clutches are operated in alternation, before one may be placed in operative position the other must be released. Thus either pinion 5 or 6 may be secured to the shaft, but before one can be secured to the shaft the other must be released.

The clutches are operated by a steam cylinder 19, whose piston is connected to one end of the lever by a link 20. The pinions 5 and 6 mesh with pinions 21 and 22, the former being journaled loosely on the shaft 23 mounted in the frame 24 in which the shaft 4 is journaled, the said frame being a part of the bed plate 14, and the latter pinion 22 is secured to a drum 25 feathered on the shaft 23. The drum 25 carries one of the elements of a friction clutch, the other element being carried by the gear wheel 21.

A coil spring 27 normally presses the clutch sections away from each other, and the sections are moved toward each other by means of a threaded rod 28 which has engagement with a nut 29 secured to the frame 24 at the end of the shaft remote from the clutch. This rod passes through the chambered end of the shaft 23 and bears against a cross pin 31 engaging a transverse slot in the shaft 23.

A lever 32 is secured to the outer end of the rod 28, and it will be evident that when the rod is turned in the proper direction the drum will be moved toward the pinion 31 to connect the drum to the pinion, and when the rod is turned in the opposite direction the spring 27 will release the parts. Thus by means of the lever 32 the drum 25 may be connected with either the pinion 5 or 6, to give high power and low speed or high speed and low power, as may be desired.

Just above the shaft 23 is journaled a shaft 34, and the said shaft is connected to the pinion 22 by means of a pinion 35. This shaft carries three drums 36, 37 and 38, upon which wind guy wires, the said wires being connected to the hollow mast 39. The drum 36 carries one of the sections 40 of a friction clutch, the other section 41 being feathered on the shaft, and a coil spring 32 normally presses the sections away from each other.

The drums 37 and 38 carry sections 43 of friction clutches which are normally pressed away from each other by a coil spring 44. These sections 43 are similar, and they co-operate with a double clutch section 45 fixed with respect to the sections 43, the arrangement being such that either drum 37 or 38 and its supported clutch section may be moved toward the section 44 to connect the said drum with the shaft 34. The drums are moved toward and from the feathered clutch sections, it being understood that the section 44 is secured to the shaft to rotate therewith, by means of the same mechanism as that shown in Figures 6 and 7, and designated generally at 46. This controlling mechanism is operated by suitable means (not shown) for connecting either of the three drums to the shaft to tighten or loosen the guy wires 47 which wind thereon.

It will be noticed from an inspection of Figure 1 that the guy wires 47 are connected with the cables 48 by blocks 49, so that leverage is obtained to tighten the cables. The drum 50 is journaled on the bed plate 14 of the engine, just in front of the drum 25, and a gear wheel 51 at the end of the drum connects the said drum with the pinion or gear wheel 21 of the shaft 23. The drum 50 is the receding drum for moving the bicycle or trolley 53 away from the mast and have a clutch as shown in Figure 2. This bicycle or trolley runs upon a supporting cable 54, and the cable 55 which winds upon the drum 50 passes from the said drum 50 over a pulley 56 on the mast to and over a pulley 57 on an anchor at a suitable distance from the mast, the opposite end of the cable from the drum being connected to the trolley, as indicated at 58. When the trolley is moved toward the mast by means of the skidding cable 59 to which are connected the grapples 60 for engaging the log 61, the drum 50 pays out the cable 55, and when the trolley is returned to grapple a log, it is returned by the cable 55. Another cable 60 is connected to a drum 61 journaled on the engine bed plate 14, and the said drum is the slack drum. This drum 61 is connected to the drum 50 by means of a pinion or gear wheel 62 which meshes with the gear wheel or pinion 51 before mentioned. The cable 60 from the drum 61 passes over a pulley 63 on the mast, and from thence around a pulley 64 on the trolley to a connection with the cable 59 at 65. The cable 59 passes over a pulley 66 on the mast, and thence over a pulley 67 depending from the trolley to the grapple.

The bed plate 14 of the engine is adjustably mounted on the car 1. The ends of the bed plate are rounded as shown in Figure 2 on arcs whose center is the center of movement of the bed plate, and the bed plate has flanges 68 at the said ends. These flanges engage beneath holding plates 70 on the car, and other holding plates 71 are provided at the sides of the bed plate, the said holding plates engaging over lateral flanges 72 on the bed plate.

It will be noticed that the free edges of the flanges 72 are curved or arc shaped, so that they may move beneath the holding plate 70 with the bed plate.

The bed plate is moved by means of a threaded rod 73 which is journaled in bearings 74 on the car 1 and at the holding plates 70. The threaded portion of the rod is engaged by a nut 75, which has oppositely extending pins engaging slots in an arm 76 in which the sleeve is held, the said arm extending longitudinally from the bed plate. The outer end of the rod has a capstan wheel 77 for turning the rod, and it will be obvious that by turning the rod in the proper direction the bed plate may be swung in either direction to properly aline the same with the mast.

A series of auxiliary or utility drums 78 is journaled on the car in front of the bed plate, and the said drums have gear wheels 79 which mesh with each other. The gear wheel of the forward drum 78 meshes with a gear wheel or pinion 80 on a shaft 81 journaled on the car, and this pinion, which is loose on the shaft, may be connected thereto by the friction clutch indicated at 82, similar to that shown in Figure 5 and operated by similar mechanism, indicated at 83. The shaft 81 has a bevel gear 84 at one end outside of the supporting frame of the car, and this gear meshes with a similar gear 85 on a line shaft 86 which is journaled in bearings 87 extending laterally from the frame. This line shaft 86 is connected by a double universal joint 88 with a shaft 89 journaled on the supporting frame 24 of the bed plate 14, and the shaft 89 has a bevel gear 90 which meshes with a similar gear 91 on the outer end of the drum 61. The line shaft 86 is thus driven from the drum 61, and since the shaft 92 between the double universal joint is a telescoping shaft, the relative movement of the bed plate with respect to the car does not affect the driving of the line shaft. This line shaft has another bevel gear 93 which meshes with a similar gear 94 on a shaft 95 journaled parallel with the shaft 81 and in front of the same.

The shaft 95 has loose thereon a pinion 96 which may be connected to the shaft by a clutch 97 similar to the clutch shown in Figure 5, and controlled by similar mechanism indicated at 98. The pinion 96 meshes with a gear wheel 99 on the shaft of a reel 100 which is mounted below the mast, and upon which winds the cable 54 upon which the trolley runs, the opposite end of the cable from the drum being connected to an anchor.

I claim:

1. In a logging device, the combination with the car and the mast carried thereby, of a bed plate carrying the engine and the drums and movable angularly with respect to the car on a center intermediate the ends of the bed plate, guides on the car for the bed plate, said guides having arc shaped flanges overlying the bed plate, and means for swinging the bed plate, said means comprising a screw journaled on the car and a nut carried by the bed plate at one end thereof through which the screw passes.

2. In a logging device, the combination with the car and the mast, the drums, of a bed plate carrying the engine and mounted to swing on the car on an axis vertical to the bed plate and car, means for swinging the bed plate, a line shaft on the car having a driving connection with the drums, a shaft on the bed plate driven by the engine, and a double universal joint telescoping connection between the line shaft and the said last named shaft.

DUFF GERARD MANGES.